United States Patent [19]

Wilson

[11] 4,132,435
[45] Jan. 2, 1979

[54] STEERABLE WHEELED VEHICLE

[75] Inventor: Kenneth L. Wilson, Chenoa, Ill.

[73] Assignee: Ken Wilson Departures, Inc., Chenoa, Ill.

[21] Appl. No.: 811,561

[22] Filed: Jun. 30, 1977

[51] Int. Cl.² .......................... B62K 5/04; B62D 9/02; B62K 27/06

[52] U.S. Cl. .............................. 280/772; 280/112 A; 280/267; 280/275; 280/282

[58] Field of Search ...................... 296/78.1; 180/25 R; 280/267, 269, 282, 283, 772, 111, 112 A, 275, 263

[56] References Cited

U.S. PATENT DOCUMENTS

| | | | |
|---|---|---|---|
| 87,713 | 3/1869 | Serrell | 280/267 |
| 453,053 | 5/1891 | Teetor | 280/275 |
| 625,377 | 5/1899 | Blood | 280/267 |
| 2,147,732 | 2/1939 | Boynton | 280/281 LP |
| 2,482,472 | 9/1949 | Fried | 280/261 |
| 3,753,577 | 8/1973 | Robinson | 280/282 |
| 4,045,077 | 8/1977 | DeVone | 296/78.1 |

Primary Examiner—Joseph F. Peters, Jr.
Assistant Examiner—Donn McGiehan
Attorney, Agent, or Firm—Wegner, Stellman, McCord, Wiles & Wood

[57] ABSTRACT

A three wheeled vehicle with a pair of steerable front wheels mounted to turn on a kingpin which is inclined forwardly and upwardly. The front wheel axis is offset ahead of the kingpin. The frame tilts in the direction of turning and the vehicle may be steered either by turning the front wheels or by leaning to tilt the frame. The vehicle is driven by a single rear wheel. In one form, the vehicle has a load carrier on the frame which tilts in a turn. In another form, the load carrier is connected with the kingpin and front wheels, remaining level in a turn. The frame has an intermediate joint so that one rear portion may be assembled with different types of front portions.

8 Claims, 7 Drawing Figures

STEERABLE WHEELED VEHICLE

This invention is concerned with a three wheeled vehicle steered by a pair of wheels connected with the frame through an inclined pivot, as a kingpin.

A typical three wheeled vehicle has a single steered wheel in front and a pair of wheels fixed to the frame in the rear. The vehicle disclosed and claimed herein has two wheels which turn on an inclined kingpin so that the frame tilts when the wheels turn and steering may be effected either by turning the wheels or by the rider leaning in the direction of the turn to tilt the frame.

A principal feature is that the steerable wheels are supported from an inclined kingpin pivot whereby the frame tilts in the direction of steering of the wheels. More particularly, the steerable wheels are in front of the frame and the upper end of the kingpin is forward of the lower end.

Another feature is that the steerable wheel axle is longitudinally offset from the kingpin. For example, where the front wheels are steerable, the wheel axis is forward of the inclined kingpin.

A further feature of the invention is that in one form of the vehicle a load carrier is mounted on a frame and tilts in a turn while in another form of the vehicle, the load carrier is mounted on the kingpin and steerable wheels, and remains level in a turn.

Yet another feature is that the frame has a front portion with the kingpin, steerable wheels and load carrier and a rear portion with a driven rear wheel. The frame is joined so that the rear wheel can be connected with an appropriate front wheel assembly.

Still another feature is that springs are provided for mounting the frame to the front wheels.

Further features and advantages will readily be apparent from the following specification and from the drawings, in which.

The three wheeled vehicle disclosed herein is preferably rider powered and is primarily intended for short trips in an urban area, as on sidewalks or streets. The vehicle combines stability with maneuverability and ease of steering in a manner not achieved by other vehicles of this character.

Figure 1:
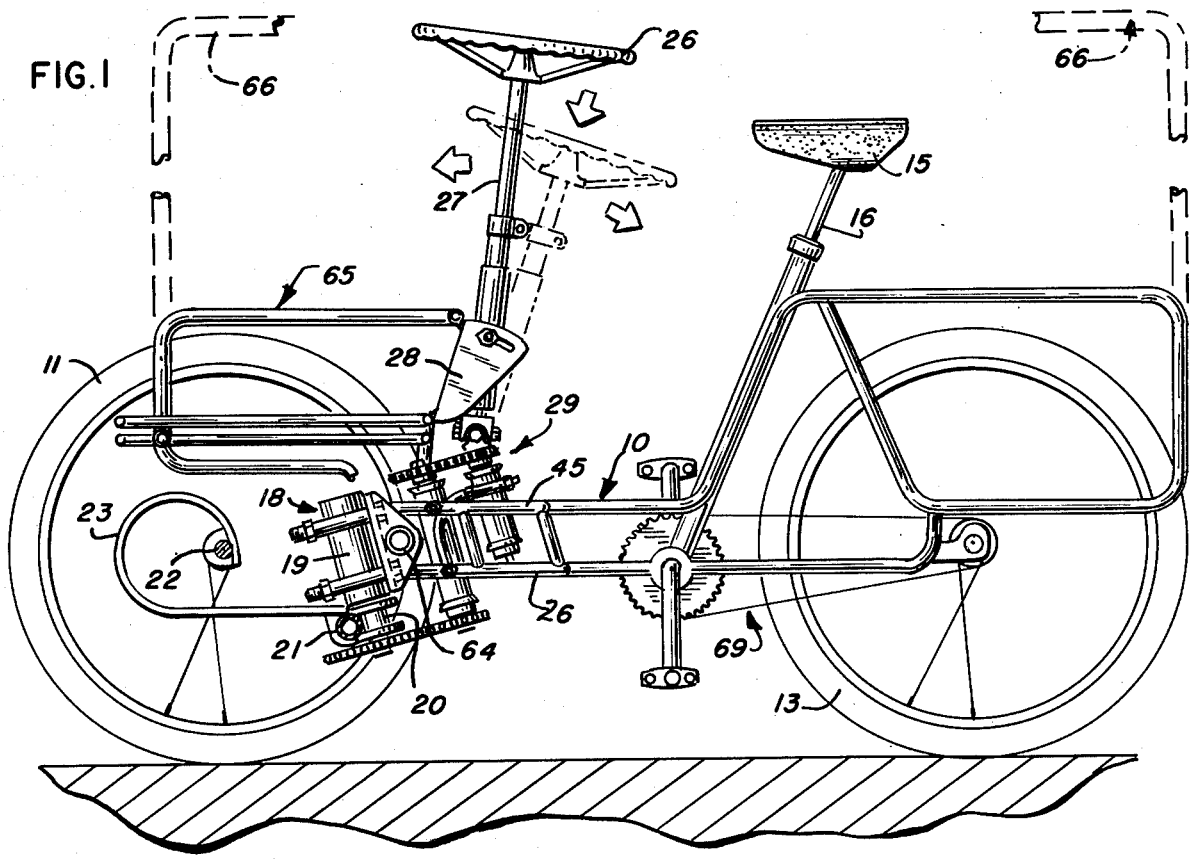
FIG. 1 is a side elevation of a preferred form of the invention with a portion broken away.
Figure 2:
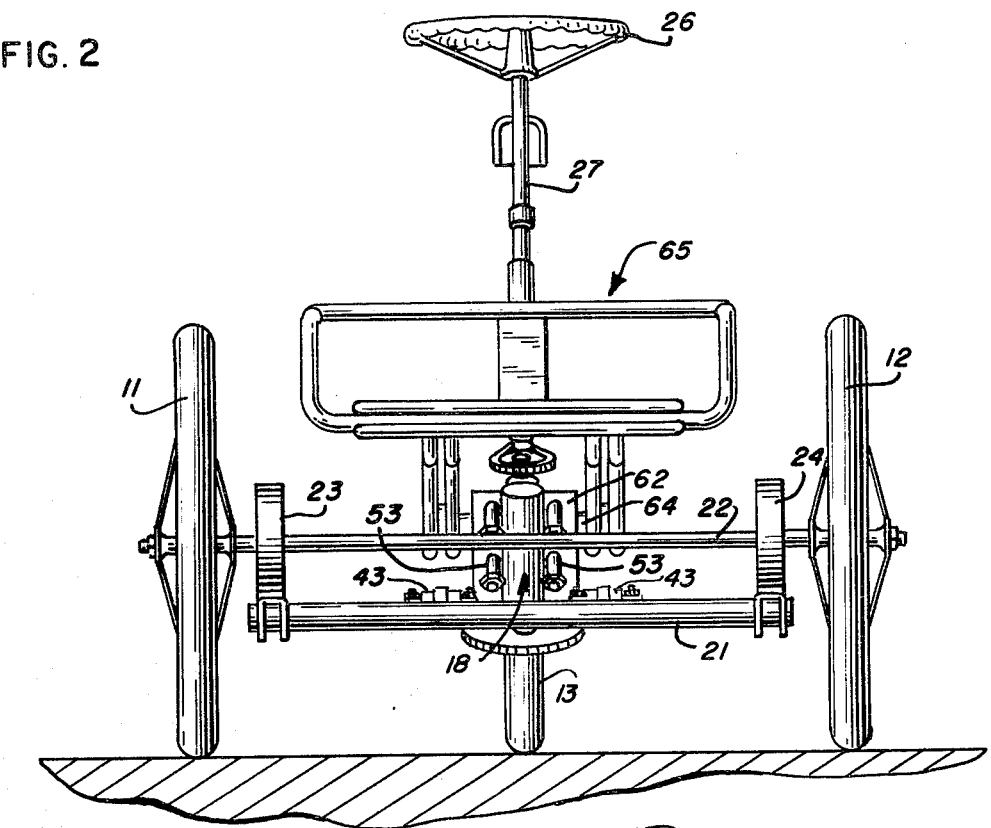
FIG. 2 is a front elevation view thereof with the steering wheels aligned with the longitudinal axis of the frame.

Referring particularly to the preferred embodiment of the vehicle illustrated in FIGS. 1 and 2, a frame 10 has a pair of steerable wheels 11 and 12 in the front and a single wheel 13 at the rear. A rider's seat 15 is mounted on a vertically adjustable stem 16 at an intermediate point of the frame 10.

A kingpin assembly 18 includes an outer sleeve 19 secured to the forward end of frame 10 as will appear in more detail below, and a rotatable kingpin 20 to which is connected a cross member 21. The front wheels 11, 12 are mounted on the axle 22 connected with cross member 21 by curved leaf springs 23, 24, supporting the front of the vehicle.

Kingpin assembly 18 is inclined so that its upper end is forward of the lower end. An inclination of the order of 10° to 15° with the greater angle of inclination preferable where the wheel base is relatively short, as 1100 mm (44 inches). The front wheels are preferably 600 mm (24 inches) in diameter and a spacing of 360 mm (34 inches) has been found satisfactory. Front wheel axle 22 is spaced forward of the kingpin axis about 160 mm (6½ inches).

Figure 3:
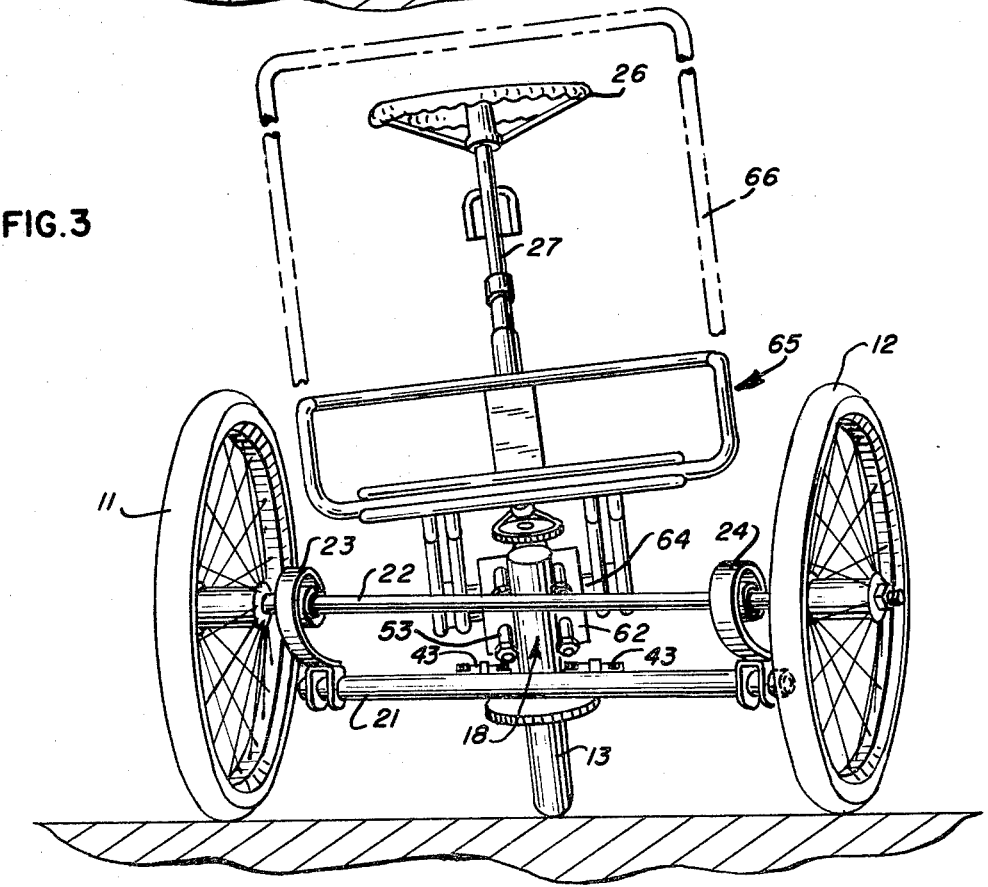
FIG. 3 is a view similar to FIG. 1 showing the wheels turned and frame tilted.

When the front wheels are turned to steer the vehicle, the inclination of the kingpin causes the vehicle frame to tilt in the direction of the turn as illustrated in FIG. 3. Conversely, the rider may, by leaning, tilt the frame causing the vehicle to turn. With the rider's weight centered, the frame returns to a vertical position with the front wheels directed forwardly, due to the combination of the kingpin inclination and the caster effect of the axial offset between the front wheel axle and the kingpin.

The front wheels are directed by a steering gear having steering wheel 26 mounted on a steering column 27 supported by a plate 28 from the vehicle frame. Both the angle and the length of the steering column can be adjusted to accommodate the size of the rider.

Figure 4:
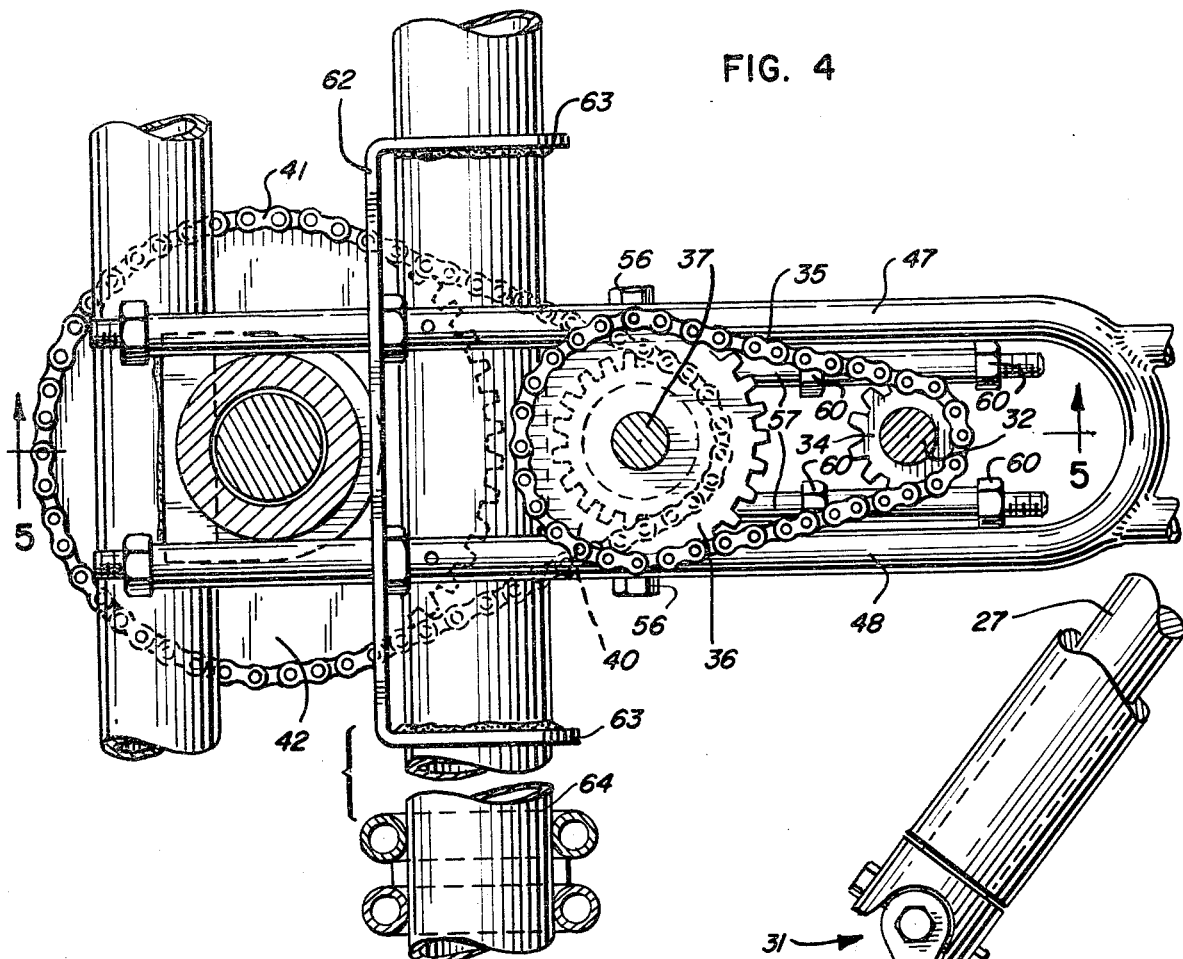
FIG. 4 is a section taken along line 4—4 of FIG. 5 illustrating details of the steering mechanism.
Figure 5:
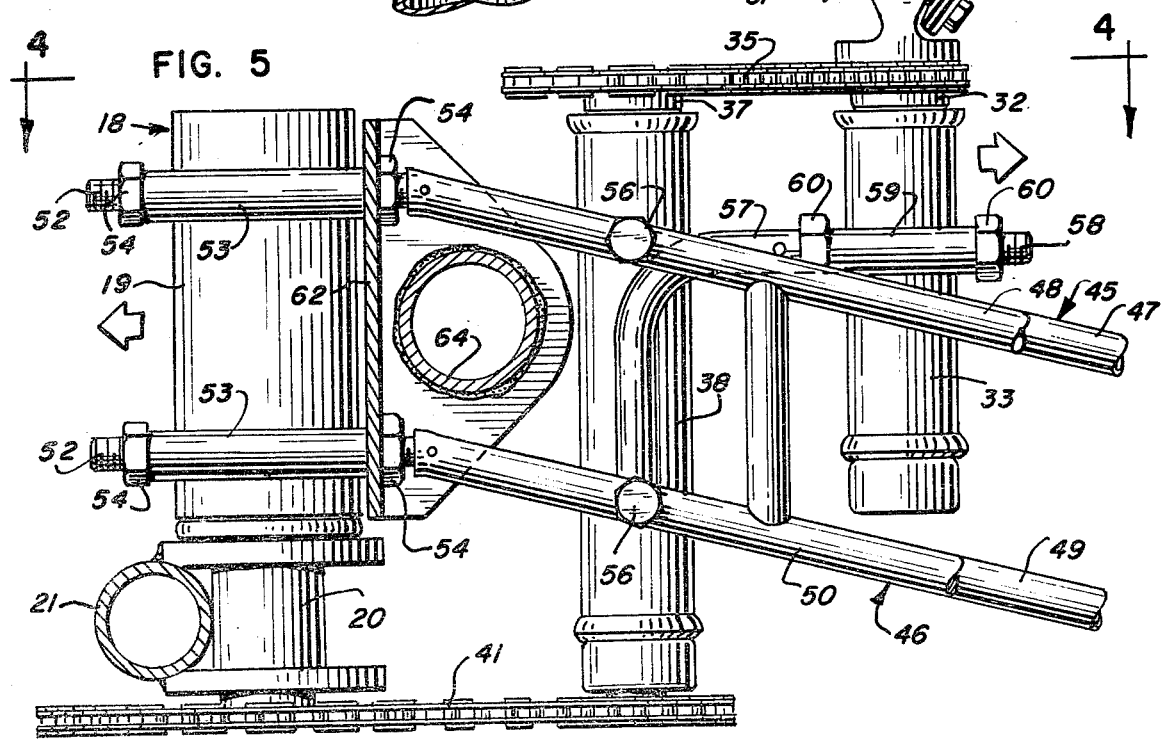
FIG. 5 is a vertical section taken along line 5—5 of FIG. 4.

A steering reduction mechanism 29 is shown in detail in FIGS. 4 and 5. The steering column 27 is connected through a universal joint 31 with a spindle 32 rotatable in sleeve 33. A sprocket 34 on spindle 32 is connected through chain 35 with sprocket 36 at the upper end of a second spindle 37 rotatable in sleeve 38. A sprocket 40 at the lower end of spindle 37 is connected through chain 41 with sprocket 42 at the lower end of kingpin 20. A reduction of 9:1 has been found satisfactory.

Stops 43 extend rearwardly from cross member 21 and strike the frame to limit turning of the front wheel assembly. The front wheels must not turn so far that a vertical plane through the center of gravity and the bottom of the rear wheel is outside the front wheel.

The vehicle frame 10 is preferably constructed of formed tubular elements. The mounting of the kingpin 18 and steering reduction mechanism 29 are illustrated in detail in FIGS. 4 and 5. The central portion of the frame has two vertically spaced, parallel U-shaped tubular sections 45, 46 with the legs 47, 48 of the upper section 45 and legs 49, 50 of the lower U-shaped section preferably equally spaced to provide a horizontal, square frame. The forward ends of each of the tubular legs extend at right angles to the plane of kingpin assembly 18. Threaded rods 52 are fixed in each of the tubes 47–50. Kingpin sleeve 19 has tubular sections 53 secured thereto which slip over the rods 52 and the kingpin assembly is positioned with respect to the frame by nuts 54.

The steering reduction mechanism 29 is mounted to the frame by bolts 56 extending through tubes 47–50 into suitable sockets (not shown) on spindle sleeve 38. Curved tubular sections 57 secured to spindle sleeve 38 have end portions extending rearwardly at right angles to the spindle axis. Threaded rods 58 mounted in the ends of tubular sections 57 are received in tubular sections 59 on spindle sleeve 33. The position of spindle 32 is adjusted by nuts 60. The distance between the centers of spindles 32 and 37, and between the centers of spindle 37 and kingpin 20 are adjusted by nuts 54, 60, respectively, to maintain an appropriate tension on chains 35 and 41.

A plate 62 is secured to the rear of kingpin assembly 18 by adjusting nuts 54. The plate has rearwardly extending ears 63 which receive a cross rod 64. A load carrier 65 extends upwardly and forwardly from the cross rod. The load carrier may conveniently be fabricated of tubing in a configuration suitable for the intended purpose of the vehicle. Steering column mounting plate 28 is secured to the rear portion of the load carrier. An overhead load carrier illustrated in broken lines at 66 may be utilized to carry long articles, or to support a cover providing shade and shelter. The load carrier 65, 66 tilt with the frame in a turn. This should be considered in the design of the load carrier.

The vehicle is preferably propelled by a pedal and chain drive 69 to the rear wheel 13. A rear wheel diameter of 600 mm (24 inches) is suitable for most conditions of use. Alternatively, a battery powered electric motor drive might be provided if desired.

Figure 6:
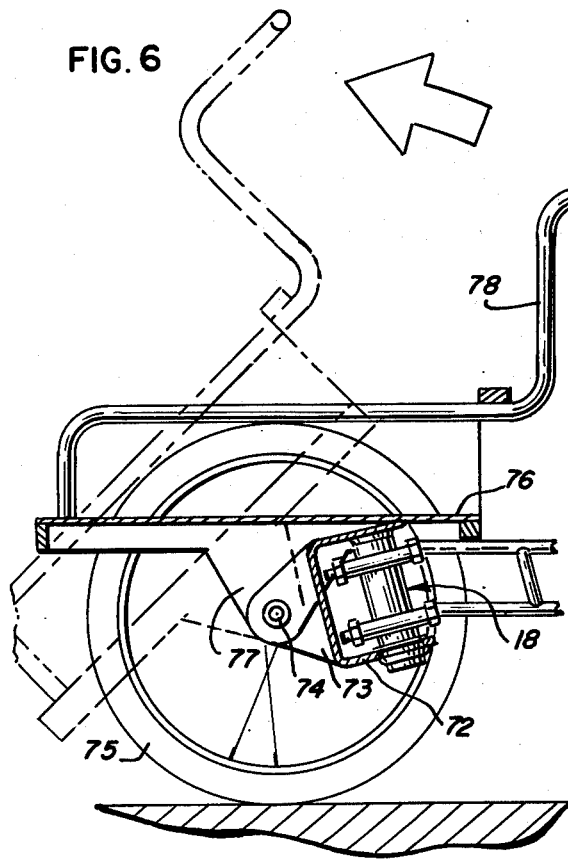
FIG. 6 is a reduced fragmentary view of another form of load carrier and front wheel assembly.
Figure 7:
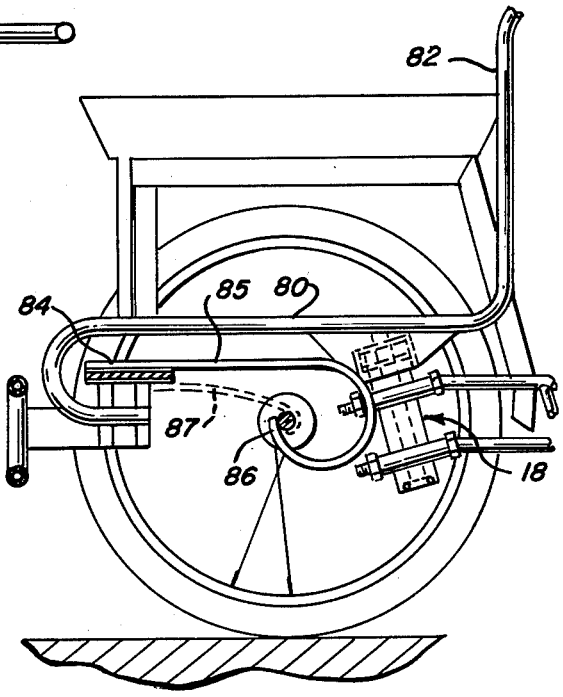
FIG. 7 is a view similar to FIG. 6 of another form of load carrier and front wheel assembly.

FIGS. 6 and 7 illustrate modified forms of the vehicle with direct steering and nontilting load carriers. In FIG. 6 a bracket is connected with kingpin 18 and has forwardly extending ears 73 (only one shown) in which the axle 74 for front wheels 75 (only one shown) is received. The load carrier 76 has a pair of downwardly extending mounting flanges 77 (only one shown) to support the load carrier from axle 74. A steering handle 78 extends upwardly from the load carrier. Preferably load carrier 76 is swivelly mounted on axle 74 for movement between the load carrying position shown and a dumping position illustrated in broken lines at 76'.

In FIG. 7 the load carrier 80 has a mounting socket 81 on the undersurface which fits over the top of the kingpin. A steering handle 82 extends upwardly. Curved leaf springs 83 (only one shown) have one end 84 secured to the load carrier and the other end 85 secured to the front wheel axle 86. An alternative form of spring is shown in broken lines 87.

The vehicle frame 10 may be utilized with either a tilting or nontilting load carrier and with either the steering reduction mechanism or direct steering. The desired front wheel and load carrier assembly are mounted on threaded rods 52 and secured in place by nuts 54. This facilitates the manufacture of different types of vehicle with a common frame and rear wheel. Moreover, a user may have a single frame and rear wheel and several front end assemblies suitable for different purposes. The appropriate front end may be selected and mounted in a matter of minutes.

I claim:
1. A steerable wheeled vehicle, comprising:
a frame;
a rear wheel supporting the rear of the frame;
a pair of steerable, laterally spaced coaxial front wheels having a common wheel axis; and
means supporting the front of the frame on said front wheels, including a kingpin pivot having an axis generally in the longitudinal plane of the frame and inclined with the upper end of the kingpin forward of the lower end and said common wheel axis is spaced forward of the kingpin pivot axis, said front wheels turning with respect to said frame on said kingpin pivot to steer the vehicle, whereby the frame tilts from the vertical in the direction of steering of the front wheels.

2. The vehicle of claim 1 in which the angle of inclination of the pivot from the vertical is of the order of 15 degrees and said common wheel axis is in a horizontal plane between the upper and lower ends of said kingpin and in a vertical plane forward of the upper end of said kingpin.

3. The vehicle of claim 1 including:
a seat for a rider on said frame;
a load carrier on said frame; and
means limiting the turning of said front wheels whereby the center of gravity of the vehicle, rider and load is inside a line drawn between the rear wheel and the outside wheel during a turn.

4. The vehicle of claim 1 including a cross member connected with said kingpin, an axle having said front wheels mounted thereon, and spring means connected between said cross member and said axle.

5. The vehicle of claim 1 in which said frame has a front portion with said pivot and a rear portion with said rear wheel, and means providing a separable joint between said front and rear portions of the frame.

6. The vehicle of claim 5 in which the front portion of said frame includes a plurality of tubular members connected with said kingpin and extending rearwardly therefrom, and the rear portion of said frame includes a plurality of forwardly extending connectors received in said tubular members, and means for securing said tubular members and connectors to join the frame portions together.

7. A steerable three-wheeled vehicle, comprising:
a frame having a forward end and a rear end;
a seat for a rider on said frame intermediate the ends thereof;
a single rear wheel supporting the rear end of the frame;
means for driving said rear wheel;
a kingpin pivot at the forward end of said frame having an axis in the plane of the frame and inclined with respect to the vehicle, the upper end of the kingpin being forward of the lower end thereof;
a cross member connected with said kingpin to rotate therewith relative to said frame;
an axle carried by said cross member to rotate therewith about the kingpin axis and relative to the frame, said axle being spaced forward of the kingpin axis when at right angles to the longitudinal plane of said frame; and
a pair of steerable front wheels on said axle to turn therewith, said frame tilting in the direction of turning of said front wheels.

8. The vehicle of claim 7 inluding spring means between said axle and said cross member.

* * * * *